United States Patent

[11] 3,542,014

[72] Inventor: Pierre Peronneau, Paris, France
[21] Appl. No.: 719,593
[22] Filed: April 8, 1968
[45] Patented: Nov. 24, 1970
[73] Assignee: Compagnie Generale d'Electricite, a corporation of France
[32] Priority: April 6, 1967
[33] France
[31] No. PV101822

[54] CATHETER WITH PIEZOELECTRIC TRANSDUCER
2 Claims, 1 Drawing Fig.

[52] U.S. Cl. .................................. 128/2, 128/24, 73/67.7
[51] Int. Cl. .................................. A61b 5/10, A61h 1/00, G01n 9/24
[50] Field of Search .................. 128/2, 2.05, 24.05, 2.1; 73/67.7—.9, 151, 152; 340/18

[56] References Cited
UNITED STATES PATENTS

| | | | |
|---|---|---|---|
| 2,648,056 | 8/1953 | Jakosky | 340/18 |
| 2,649,163 | 8/1953 | Atkins | 181/0.5 |
| 3,323,512 | 6/1967 | Clynes | 128/2 |
| 3,430,625 | 3/1969 | McLeod | 128/2.05 |

Primary Examiner—Richard A. Gaudet
Assistant Examiner—J. B. Mitchell
Attorney—Sughrue, Rothwell, Mion, Zinn and Macpeak ABSTRACT: Catheter comprising, at its terminal, two piezoelectric transducer plates back to back.

Patented Nov. 24, 1970    3,542,014
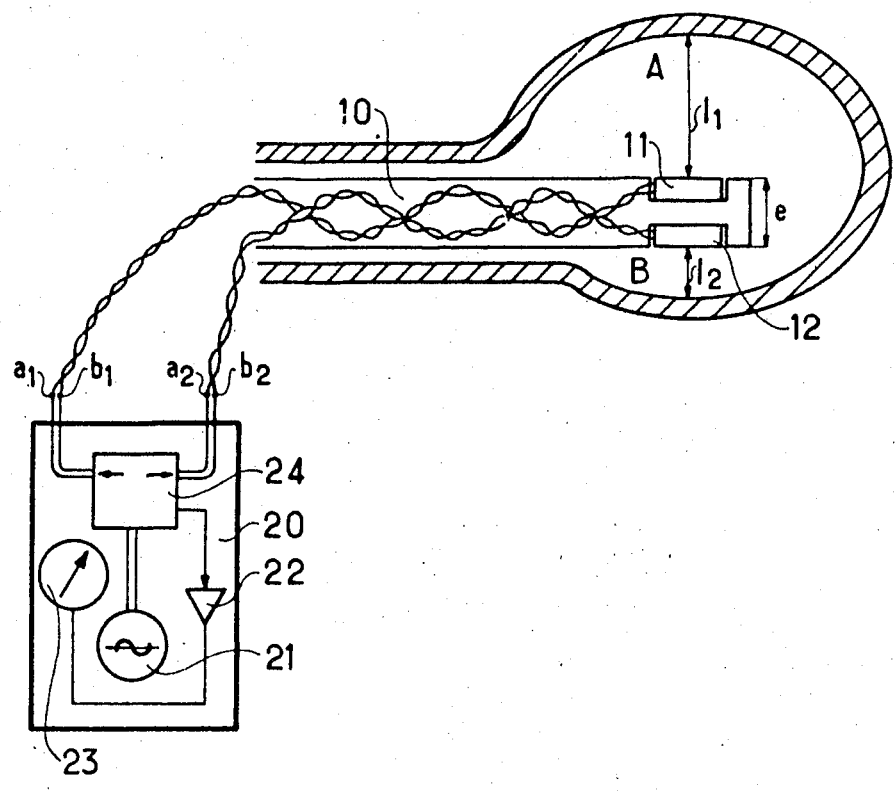

CATHETER WITH PIEZOELECTRIC TRANSDUCER

The invention relates to a means by which it is possible to measure the width of a cavity of the body, particularly of the circulatory system, for example a ventricle, by ultrasonic echography.

It is known to make measurements of the diameter of a blood vessel by measuring the time which elapses between the reflection of an impulsive wave train on a first zone of the surface of separation between the wall of a vessel and the liquid which is circulating therein, and the reflection on a second surface of separation between the said liquid and another zone of the vessel wall.

On the other hand, by the "catheter" technique, it is known to introduce an exploring member, for example an ultrasonic transducer, by the natural routes into the circulatory system. By measuring, by appropriate means, the time which elapses between the transmission of an ultrasonic pulse in a cavity by a transducer carried by an introduced catheter and the reflection of this pulse by the wall of the said cavity, there is deduced therefrom the distance between the transducer, which can have a dimension of the order of 2 to 3 mm, and the wall of the cavity.

However, the cavity generally does not have the form of a surface of revolution which permits of deducing its "diameter" by doubling the value of its "radius". As a result, the width of the cavity cannot be derived from a single measurement effected from one position of the transducer-carrying catheter.

In accordance with the invention, for overcoming this disadvantage, a means for measuring a dimension of a cavity of the body comprises a catheter which carries at its end two plates capable of functioning as a piezoelectric transducer or the like, connected to two lines situated inside the catheter.

In this way, by causing each transducer to function successively as transmitter and as receiver, according to a known process which is already used for measuring the diameter of a cylindrical conduit, there is obtained a first distance measurement between the catheter and a first zone of the wall of the cavity facing a first piezoelectric ceramic plate, and a second distance measurement between the catheter and second zone of the wall of the cavity which faces a second piezoelectric ceramic plate parallel to the said first plate and of opposite orientation. Two aligned lengths $l_1$ and $l_2$ are thus measured. By adding the thickness of the catheter to the sum of $l_1 + l_2$, the width of the cavity is obtained.

One embodiment of the invention is shown diagrammatically and by way of example in the FIG.

A catheter 10, introduced by the natural routes into a cavity shown in section, carries at the end two piezoelectric ceramic plates 11 and 12 which are back-to-back, one facing towards a part A of the cavity and the other towards the part B. The distance between the external face of the plate 11 and the bottom of the portion A is $l_1$, and the distance between the external face of the plate 12 and the bottom of the portion B is $l_2$.

An arrangement 20 for transmitting and receiving ultrasonic wave pulses comprises essentially a generator 21, a receiver 22, a measuring, indicating or recording apparatus 23, a preferably two-pole, two-way reversing switch 24, having a first output $a_1b_1$ towards the line of the transducer 11, and a second output $a_2b_2$ towards the line of the transducer 12.

In the first position of the reversing switch, and by virtue of means which well known per se and are not shown in the FIG., the apparatus 23 indicates or records the time which elapses between the instant of transmission of a pulse by the plate 11 and the instant of return of the echo on the bottom of the part A of the cavity, this giving a measurement of the length $l_1$. With the reversing switch in the second position, there is read on the apparatus 23 the time which elapses between the instant of transmission of a pulse by the plate 12 and the instant of return of the echo on the bottom of the part B of the cavity, this giving a measurement of the length $l_2$. By adding the distance $e$ two external faces of the plates, the width of the cavity $l_1 + l_2 + e$ is obtained.

I claim:

1. Apparatus for measuring a dimension of a body cavity by ultrasonic echography comprising: a catheter, a pair of piezoelectric transducers carried by said catheter in back-to-back relationship at the terminal end thereof for transmitting and receiving ultrasonic wave pulses, signal transmission means carried by said catheter and coupled at one end to said respective piezoelectric transducers, means connected at the other end of said signal transmission means for transmitting and receiving signals to and from said piezoelectric transducers and means to convert the time lapse of said signals into an indication of a dimension of the body cavity being measured.

2. The apparatus as claimed in claim 1 wherein said means to convert also includes means to record the time elapsed between the transmission of a pulse and the return of the corresponding echo.